Sept. 20, 1966  A. F. MANZ ETAL  3,274,371

METHOD OF DEPOSITING METAL

Filed June 1, 1965  2 Sheets-Sheet 1

INVENTORS
AUGUST F. MANZ
JOHN F. SAENGER, JR.
BY Dominic J. Tunnicelli
ATTORNEY

INVENTORS
AUGUST F. MANZ
JOHN F. SAENGER, JR.

3,274,371
METHOD OF DEPOSITING METAL
August F. Manz, Union, and John F. Saenger, Jr., Springfield, N.J., assignors to Union Carbide Corporation, a corporation of New York
Filed June 1, 1965, Ser. No. 460,441
25 Claims. (Cl. 219—137)

This invention relates to a process for depositing metal on a workpiece. More particularly, this invention relates to a method for depositing metal wherein an energy source having an associated magnetic field is used to heat the workpiece while consumable wires, heated by current flowing therethrough under a voltage insufficient to establish an arc, supply at least some of the metal to be provided on the workpiece.

There is known in the prior art a process for depositing metal from a consumable wire wherein the metal is melted by providing electrical energy to the wire in the form of $I^2R$ heating such that the wire will be melted or deposited without the presence of an arc. Usually the process is practiced by feeding a consumable wire to a molten puddle, on a workpiece, created by an electrical energy source such as an arc. Current is introduced into the wire as it passes through a contact tube which is connected in circuit with a power supply and the workpiece. When the wire contacts the puddle, the circuit is completed from the power supply through the contact tube to the wire to the workpiece. Electric current flowing through the circuit heats the extended portion of the wire between the contact tube and the workpiece as a result of the $I^2R$ power consumed in this portion of the circuit. That portion of the wire between the contact point and the workpiece is referred to hereinafter as the wire extension. The wire is melted in the puddle in part by this $I^2R$ heating and in part by heat radiated from the arc as well as the heat picked up by conduction from direct contact with molten puddle. This process will be referred to hereinafter as "arcless metal deposition."

The arcless metal deposition process is finding utility especially, for example, in processes for joining metals and surfacing operations such as processes for providing corrosion resistant and/or wear resistant surfaces among others. In the practice of this process, it was noted that the current flowing through the consumable wire created a magnetic field around the wire which, because of the proximity of the wire to the arc and weld puddle, caused the arc to be deflected if D.C. were used or to oscillate if A.C. were used. At low current and deposition rates, this magnetic field did not have a significant effect on the arc. However, as deposition rates were increased which required a corresponding increase in current to melt the wire, it was found that the magnetic field around the wire had a serious deleterious effect on the arc stability and the weld puddle. This arc interference usually occurred when the current in the wire was equal to, or significantly larger than, the current of the arc. This is not to imply that a large current magnitude is necessary for producing interference. Interference is also dependent on the "stiffness" of the arc as well as its current magnitude. Interference can occur at wire currents which are lower than arc currents. Accordingly, unless there was some way to eliminate or control this magnetic interaction of the fields around the wires and the arcs there would be a practical limitation on the wire deposition rates that could be achieved by arcless metal deposition.

It is the main object of this invention to provide a metal deposition process wherein magnetic interaction between the field around a current-carrying consumable wire and the field around the heating source is controlled in a predetermined mode.

Another object is to provide such a process wherein the magnetic fields around the current-carrying consumable wires have essentially no effect on an electric arc heating source.

A further object is to provide such a process wherein the magnetic fields around the consumable wires are controlled so as to produce sweep of the arc on the workpiece.

Yet another object is to provide a process for welding or weld surfacing wherein high deposition rates are achieved with controlled arc movement.

Another object is to provide such a process wherein the arc interference is substantially eliminated.

Still another object is to provide a process for depositing metal with the arcless metal deposition process wherein an arc is used as a heat source and wherein large diameter wires are used as the consumable wires at practically obtainable wire feed speeds and currents.

Another object is to provide a process for alloying the surface of a workpiece wherein electric arcs are used as the heat source and alloy containing consumable wires are utilized as at least part of the source of alloying elements and wherein the magnetic lelds around the consumable wires, cause the arcs to sweep on the surface on the workpiece.

While the above objects are the most important objects of the invention, other objects will become apparent from a reading of the following disclosure and claims and from a review of the drawings wherein:

FIGURE 1 as a schematic diagram of typical apparatus for carrying out the process of the invention;

Figure 1:
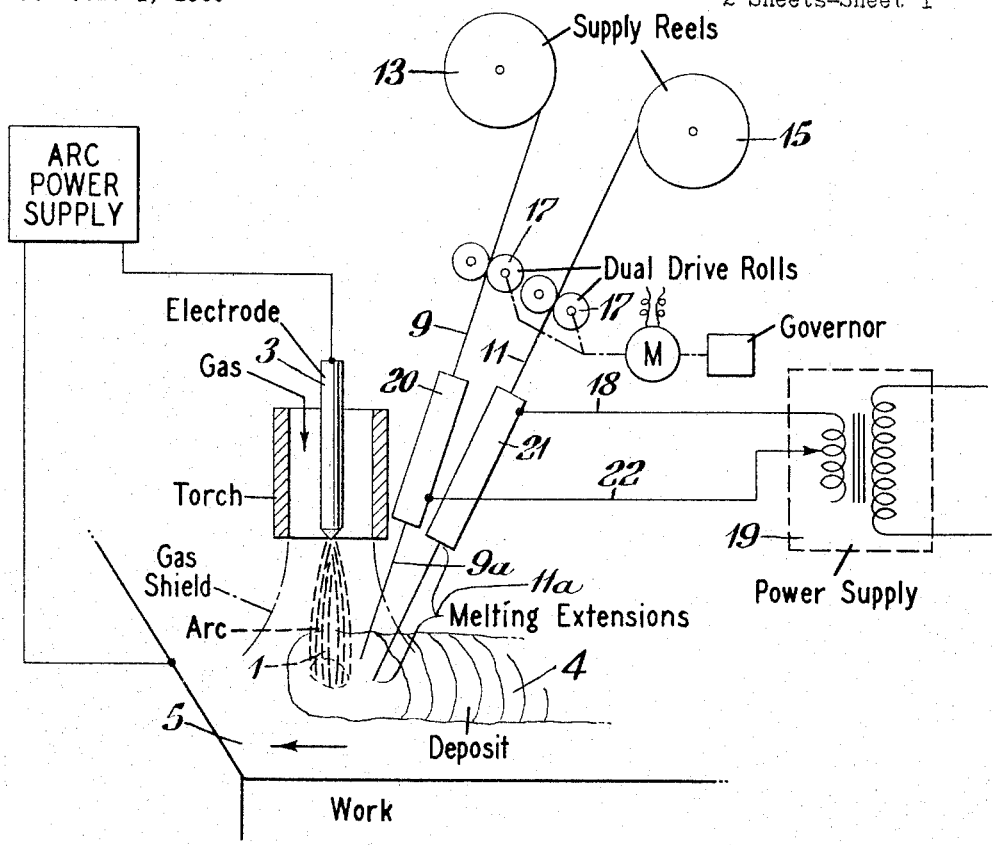

In this disclosure weld surfacing is used to define those processes wherein a coating is provided on the workpiece while maintaining dilution of the coating into the base to a minimum. Alloying is defined as a process of providing an alloyed surface on a workpiece wherein the dilution of the alloyed surface into the workpiece is substantial and, in fact, the base metal itself provides some of the alloying constituents.

This invention is based on the discovery that the magnetic interaction between the field created around an electric arc and fields created around current-carrying consumable wires which provide metal to a molten surface without the presence of an arc, can be controlled in a predetermined manner by correlating the polarity of current flowing in such wires and by controlling the magnitude of such current.

Our discovery opens a completely new area for metal deposition rates which has applicability and utility with any of the known welding processes whether they be for joining members, cladding members, alloying surfaces, coating surfaces, etc., and without regard to whether the arc is shielded with a gas and/or welding flux or if no shielding medium is used and regardless of how the gas and/or flux are provided around the arc.

In most welding operations, whether they be joining or surfacing, it is usually desirable to eliminate the magnetic effect, of fields in the vicinity of the arc. In one aspect of our invention this is achieved by providing at least two consumable wires connected in series circuit relationship with each other and the workpiece or at least a molten puddle on the workpiece surface through a single power source. This arrangement will insure that the polarities of the current in each wire are opposite to each other so that the net magnetic field around the wires will have essentially no effect on the arc which is directed to the workpiece and is proximate to the wires. While this one mode of operation is usually preferred and will be described in greater detail hereinafter in referring to FIG. 1, the concept of the invention is not in any way limited to such arrangement. As will be noted in referring to FIG. 3, each of at least two consumable wires may be connected to separate power supplies with the circuit for each wire being completed through its power supply, the wire, the workpiece and back to the power supply. In this case, if the power supplies are D.C. sources, the polarities must be selected to either eliminate the net magnetic field or to cause sweeping of the arc on the workpiece. If the power sources are A.C. sources, the currents in the wires should be so phased relative to each other and to the arc to provide the effect desired on the arc. It should be noted, and it will be made clear in referring to FIG. 4, that the term "sweeping of the arc" is not limited to horizontal oscillation but also encompasses circular movement of the arc.

For the purpose of this disclosure the term "wire" means the usual cylindrical wires as well as noncylindrical wires such as flat strips of metals, tubular wires, or composite wires such as two or more wires twisted together.

As mentioned above, the basic concept of this invention has wide applicability in the welding art. Some of these utilities will be described in referring to the drawings, but having disclosed the concept, other utilities for the invention will normally occur to various skilled artisans.

Having described the invention in general terms, reference now will be to the drawings for a more detailed disclosure of the invention. Referring particularly to FIG. 1, an electrical heat source usually an arc 1 is established between an electrode 3 and the workpiece 5 and creates a molten puddle 4 thereon. Power is supplied to the arc 1 from source 19. Power for the arc may be direct current straight (electrode negative) or reversed (electrode positive) polarity or it may be A.C. single-phase or multiphase if several arcs are desired. The electrode 3 may be consumable, that is the electrode itself may supply some of the metal to be deposited. In that respect, the consumable electrode could be an ordinary air-operating stick electrode, a tube rod wherein a flux is contained in a hollow metal sheath, a flux-coated rod where the flux is coated on to the electrode or a continuous consumable wire wherein the flux adheres to the wire by magnetic action between the current-carrying wire and the flux.

The arc established from the consumable electrode can be shielded by a gas as in the metal inert gas (MIG) process. The MIG process briefly comprises establishing an arc from the end of a consumable wire which is of a chemical composition appropriate for the welding or surfacing which is to be performed and the arc is shielded by a gas which may be argon, helium, $CO_2$, or mixtures thereof, with each other or with oxygen, hydrogen and nitrogen among others. The MIG process is further described in the prior art by U.S. Patent 2,504,868, issued Apr. 18, 1950, to A. Muller et al.

The arc may also be shielded by a flux composition such as in submerged arc welding. This process usually involves covering the joint to be welded with a flux and establishing an arc under such flux so that the arc is not visible. Such process is defined more fully by Jones et al. in U.S. Patent 2,043,960.

The electrode 3 may also be nonconsumable, such as for example tungsten or variations thereof such as 2 percent thoria in tungsten. The arc from such electrode may be shielded by a gas such as argon or helium or mixtures thereof as is well known in the practice of tungsten inert gas (TIG welding) processes. The TIG process briefly usually involves the use of a nonconsumable tungsten electrode for straight polarity welding. On reverse polarity the electrode is usually water-cooled copper. The electrode usually extends beyond a gas-directing nozzle through which is provided the protective envelope of gas-shielding.

The arc used to heat the work may also be a plasma arc. This type of process involves establishing an arc between two electrodes, one of which may be the workpiece, in which case the arc is described as being transferred. A gas is introduced into the arc, then the arc and arc gas are passed throngh a constricting passage to create a directionally stable high energy density arc. This type of arc process is described further by Gage in U.S. Patent 2,806,124.

Consumable wires 9 and 11 are fed from sources thereof 13 and 15 by a dual drive feed roll 17 mounted on, and insulated from, the shaft of a wire feed motor. The circuit for the wires is completed from power source 19 to contact tube 21 through wire 11 and wire extension 11a to the molten puddle, through the puddle to the wire extension 9a of wire 9, through contact tube 20, back to the power supply 19. With this circuit arrangement, it will be noted that the current polarity in the two adjacent wires is always opposite so that the net magnetic field around such wire is negligible and has essentially no effect on the arc 1. Power source 19 may be D.C. or A.C., however, A.C. is preferred. As will be described hereinafter referring to FIG. 2 and FIG. 3, each wire 9 and 11 or additional wires if more than two are used may be connected to separate power supplies or to multiphased A.C. power supplies such as for example 3 or 6 phase A.C.

In operation, the wires 9 and 11 are fed from supplies 13 and 15 by the rolls 17 through contact tubes 21 and 20 connected to power source 19 by conductors 18 and 22. The consumable wires 9 and 11 are heated by $I^2R$ heating effect of an electric current flowing through such wires between the contact tubes and the work. This portion of the wires is shown as the melting extension in FIG. 1. As an increment of wire exists from the contact tubes, it is at room temperature but is carrying current supplied by source 19. As the wire moves through the melting extension its temperature is raised by $I^2R$ heating. The current is adjusted so that the wires reach melting conditions as they enter the molten puddle which has been created by the arc 1 on the work. In order to facilitate starting of the metal deposition from such wires, it is desirable to provide a temperature gradient in the wire from the point of contact in the tubes 21 and 20 to the work. This can be achieved in a number of suitable ways. One such mode is simply to heat the wires as they emerge from the contact tubes 21 and 20 by an ordinary flame from an oxy-fuel blow torch.

The wire feed speeds, the contact point between the contact tube and the wires, and the electrical energy introduced into the wire are controlled so that the wires melt in the molten puddle without the establishment of an arc off the end of the wires.

The wires are positioned proximate to each other and close enough to the arc and the polarities are controlled so that the net magnetic fields around the wires in this case has essentially no effect on the arc.

The advantages of this process for welding are several in addition to the main advantage of controlling magnetic interaction around the arc. The amount of current necessary to melt the same amount of consumable wires is reduced since the effective melting extension is at least doubled when two wires are used in series. Of course, the voltage drop between the points of contact on the wires is increased, but this is not a problem since a power source can be easily manufactured to supply the required voltage.

Another advantage of the process is that the individual wire speeds required to deposit the same amount of metal as with one wire are cut in half.

Further, since it is now possible in the practice of the invention to cancel the effect of the magnetic field around the consumable wires, it is possible to use larger diameter wires and high currents which, of course, are advantageous when attempting to increase metal deposition rates.

The following examples are provided to give illustrative conditions under which to practice the process of the invention for joining metals in the first example and for surfacing metals in the second example.

EXAMPLE I

Apparatus of the type shown in FIG. 1 was utilized. The torch was a standard metal inert gas (MIG) torch wherein a consumable $\frac{1}{16}$ in. diameter wire electrode was fed toward the work. The work was $\frac{1}{2}$ in. thick mild steel to be joined a $\frac{3}{8}$ in. fillet weld in the flat position. The arc current was 400 amperes at 29 volts direct current reverse polarity. Electrode feed speed was 352 i.p.m. which deposited metal at 18.35 lbs./hr. The shielding gas was 2 percent oxygen in argon at 40 c.f.h. Two, $\frac{1}{16}$ in. consumable wires of the same composition as the electrode were fed into the weld puddle $\frac{3}{8}$ in. behind the arc axis. Such wires were inclined at about 20 degs. to the axis of the electrode. The wire feed speed was 257 i.p.m./wire or a total of 514 i.p.m. Metal deposition was 26.8 lbs./hr. Current was provided from an A.C. source to the series connected wires at 255 amperes and 16.8 volts. The total deposition rate was 45.15 lbs./hr. without any detrimental arc interference.

EXAMPLE II

Figure 5:
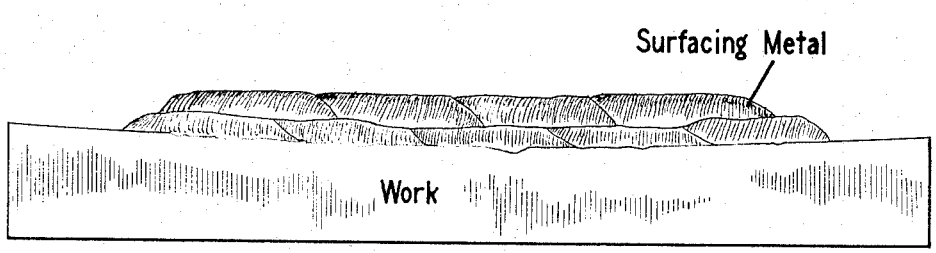
FIGURE 5 is a cross-sectional view of a workpiece which has been weld surfaced according to one aspect of the invention.

In this example apparatus of the type depicted in FIG. 1 was utilized. The base material was HY–80 steel which has a general composition of 0.18 percent maximum carbon; 0.10 percent to 0.40 percent manganese; 1.00 percent to 1.80 percent chromium; 2.00 to 3.25 percent nickel; 0.20 percent to 0.60 percent molybdenum; 0.15 percent to 0.35 percent silicon; 0.025 percent maximum phosphorus; 0.025 percent maximum sulfur; and the balance iron. The object was to deposit Monel on the base plate with low dilution into the base plate while achieving good weld soundness at the highest possible deposition rates. The electrode was a consumable electrode of $\frac{1}{16}$ in. diameter Monel having a composition of approximately 65 percent nickel; 28 percent copper; 3.5 percent manganese; 0.95 percent silicon; 0.05 percent cobalt; 2 percent titanium; balance consisting of iron, carbon, sulfur, aluminum, and chromium. The arc was established at 280 to 300 amperes, 36 volts direct current reverse polarity. Feed speed was 345 i.p.m. Travel speed was 8 i.p.m. The torch was oscillated over $\frac{3}{4}$ in. wide path at 78 to 80 cycles/minute. The shielding gas was 50 percent helium, 50 percent argon at 100 c.f.h. A trailing shield of argon at 60 c.f.h. was used. The two consumable wires were connected in series to a single-phase 60 cycle A.C. power supply at 175 amperes and 10 volts. The wires were 0.45 in. diameter Monel with extensions of 1½ in. Wire feed speed was 315 i.p.m./wire or 630 i.p.m. total. The wire touched the molten puddle established by the arc at about $\frac{3}{16}$ in. apart. The distance from arc to the wires was about $\frac{3}{8}$ in. There was no noticeable magnetic interference between the field around the arc and the wires. The wires were inclined at an angle of about 20 degs. from the vertical axis of the consumable electrode. FIGURE 5 illustrates the cross-section of the surface deposit produced. The dilution of the deposit by the base plate was about 6 percent. The deposition rate of all the metal (two wires and electrode) was 38 lbs./hr.

Highest deposition rates achievable with present stick electrode methods for depositing Monel are 7–10 lbs./hr. and with standard MIG techniques 12–15 lbs./hr. while the lowest dilution of the deposit is about 10–15 percent. This is compared with 38 lbs./hr. and even higher deposition rates with 6 percent dilution of the base plate into the deposit obtainable by the process of the invention.

Thus, it can be seen that the elimination of magnetic interference in the above situation has greatly increased the practical deposition rates.

In applying the inventive concept to surfacing applications, the manner in which the alloying elements or hard-surfacing materials are provided to the surface to be so treated are many. The consumable wires which may be similar or different wires, may provide all of the materials to be deposited or they may provide some of the materials with additional materials being provided by a consumable electrode or a welding composition containing desired alloying elements or hard-surfacing materials. The manner in which the welding composition is provided to the arc zone is varied. The composition may be passed into the arc and carried to the workpiece by the arc or the composition could be entrained in a gas and carried to the workpiece. Further, the composition could be deposited on the surface by a gravity feed device or the composition could be provided on the surface before the operation is begun. Any and all of these techniques are within the scope of the invention.

Figure 2:
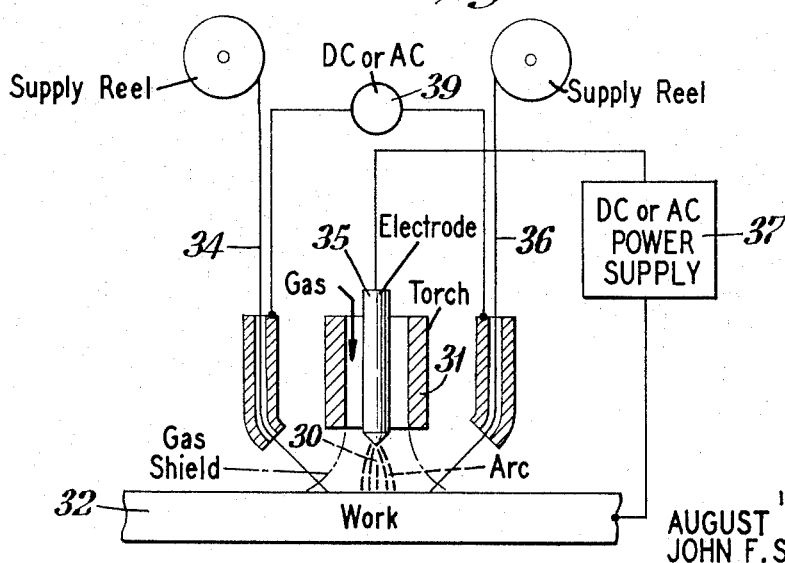
FIGURE 2 is an alternative arrangement for carrying out another embodiment of the invention.

Referring to FIG. 2, the arrangement of apparatus there shown is useful for obtaining sweeping of the arc 30 on the workpiece 32. This embodiment of the invention would find utility for depositing alloying material into a base member where a continuous puddle of molten alloyed metal of a uniform desired layer depth across the entire lateral surface of the base member is desired. FIGURE 2 shows one arc device 31 and two consumable wires 34 and 36. It should be understood that the arrangement may be repeated many times, if it is desired, to cover a wider slab. Arc device 31 may be a TIG or MIG torch or it may be a plasma arc producing device. The arc is established between the electrode 35 and the work through power source 37 which may be either a D.C. or single or multiphase A.C. where more than one electrode 35 is used. The consumable wires 34 and 36 are connected to a power source 39 which may be a D.C. or A.C. source. If the power source 39 is D.C., the wires are connected in series so that the opposite fields around each wire will cause the arc 30, which in this case would be an A.C. arc, to sweep across the workpiece surface. If multiple A.C. arcs are used, it is possible to eliminate the current connection to the workpiece. The wires 34 and 36 contain at least some of the alloying elements needed to produce the alloy surface. Additional material may be provided by the electrode 35 or by a composition provided on the surface to be alloyed.

It is to be noted that the important criteria is that the magnetic fields by arranged by controlling polarities and/or phasing of the current when A.C. is used, as well as the current magnitudes, to provide the desired magnetic interaction between the fields around the wires and the arcs.

Figure 3:
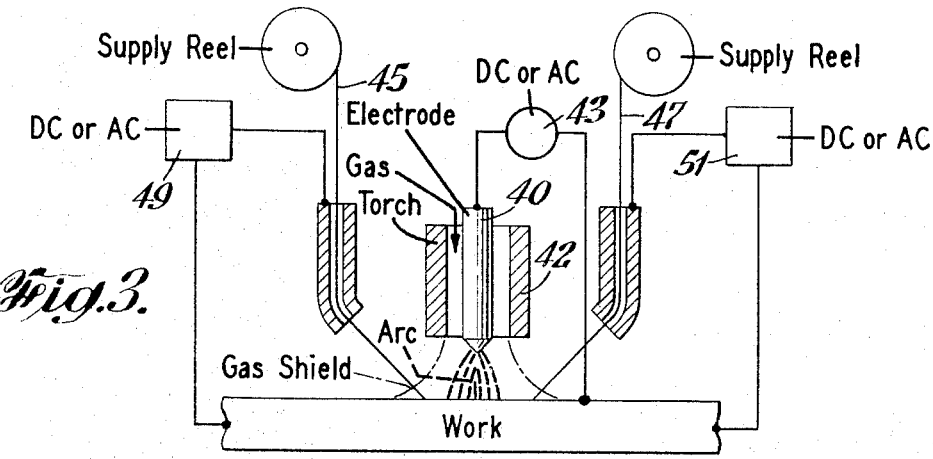
FIGURE 3 is another alternative to that shown in FIG. 1.
Figure 4:
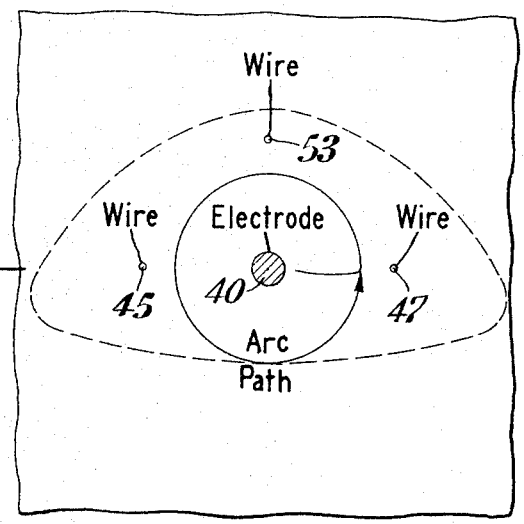
FIGURE 4 is a plan view showing schematically how the arcs may be swept by the magnetic fields around the consumable wires.

FIGURE 3 shows a modification of the apparatus shown in FIG. 2. In this embodiment the arc is established from electrode 40 in device 42 to the workpiece. Power is provided from an appropriate source 43 which may be either A.C. or D.C. Consumable wires 45 and 47 are each connected to the workpiece through their own power supplies 49 and 51. A third wire 53 is connected to a third power supply (not shown), positioned behind the arc (see FIG. 4). In this arrangement the relative polarities and magnitudes of currents in the wires and the arc are related so that the total motion of the arc is in the circular path illustrated in FIG. 4.

Having described the invention with reference to certain preferred embodiments and modifications thereof, it is to be understood that other modifications may be made to the embodiment for practicing the invention without departing from the spirit and scope thereof.

What is claimed is:
1. Process for depositing metal which comprises:
   (a) heating a zone of a workpiece with an energy source having a magnetic field associated therewith;
   (b) feeding at least two consumable wires into the so-heated zone;
   (c) providing current through said wires in the extension portions thereof;
   (d) positioning such wires in the vicinity of such energy source so that the magnetic field of such energy source interacts in a predetermined mode with the magnetic fields created by said current flowing in said wires;
   (e) controlling the feed rate, the current, and the extension of said wires so that such wires melt in the so-heated zone without the establishment of an arc off the ends of said wires.

2. Process for depositing metal which comprises:
   (a) establishing at least one electric arc between an electrode and a workpiece;
   (b) establishing a molten puddle on said workpiece with said arc;
   (c) feeding at least two consumable wires into said molten puddle;
   (d) providing current through said wires in the extension portion thereof;
   (e) positioning such wires proximate to each other in the vicinity of such arcs so that the magnetic field of such arc interacts in a predetermined mode with the magnetic field created by said current flowing in said wires;
   (f) controlling the feed rate, the current and the extension of said wires so that such wires melt in the molten puddle without the establishment of an arc off the end of said wires.

3. Process of electric arc working which comprises:
   (a) establishing at least one electric arc between an electrode and a workpiece;
   (b) establishing a molten puddle on said workpiece with said arc;
   (c) feeding at least two consumable wires into said molten puddle;
   (d) providing current through said wires in the extension portion thereof;
   (e) positioning such wires proximate to each other in the vicinity of such arcs;
   (f) controlling the polarity and magnitude of such current through such wires so that the net magnetic field around said wires will have essentially no effect on the magnetic field around said arc;
   (g) controlling the feed rate, the current, and the extension of said wires so that said wires melt in the molten puddle without the establishment of an arc off the end of said wires.

4. Process according to claim 3 wherein said electrode is consumable.

5. Process according to claim 3 wherein said electrode is consumable and said arc is shielded by a gas.

6. Process according to claim 3 wherein said electrode is nonconsumable.

7. Process according to claim 3 wherein said electrode is nonconsumable and said arc is shielded by a gas.

8. Process according to claim 3 wherein said electrode is consumable and said arc is shielded by a flux.

9. Process according to claim 3 wherein said electrode is nonconsumable and a gas is introduced into said arc and said arc and gas are passed through a constricting passage to produce a directionally stable high energy density arc effluent.

10. Process of electric arc working which comprises:
    (a) establishing at least one electric arc between an electrode and a workpiece;
    (b) establishing a molten puddle on said workpiece with said arc;
    (c) connecting two consumable wires in series circuit relationship with each other and a single power source separate from the source of power for said arc;
    (d) feeding said wires into said molten puddle;
    (e) positioning such wires proximate to each other and to said arc;
    (f) causing predetermined current to flow through said wires in said series circuit so that the polarity of the current through said wires is such that the net magnetic field around said wires has essentially no effect in the magnetic field around the arc;
    (g) controlling the feed rate, the current and the extension of said wires so that such wires melt in the molten puddle without the establishment of an arc off the end of said wires.

11. Process according to claim 10 wherein said single power source is a D.C. power source.

12. Process according to claim 10 wherein said single power source is an A.C. power source.

13. Process of electric arc working which comprises:
    (a) establishing at least one electric arc between an electrode and a workpiece;
    (b) establishing a molten puddle on said workpiece with said arc;
    (c) feeding at least two consumable wires into said molten puddle;
    (d) connecting each of said wires in separate circuit relationship with a power supply and the workpiece of said power supplies being separate from the power supply energizing the electric arc;
    (e) causing predetermined current to flow through each of said wires;
    (f) positioning such wires proximate to each other and to said arc;
    (g) controlling the polarity of such current flow so that the magnetic field around the wires has essentially no effect on the magnetic field around the arc;
    (h) controlling the feed rate, the current and the extension of said wires so that such wires melt in the molten puddle without the establishment of an arc off the end of said wires.

14. Process for surfacing a workpiece which comprises:
    (a) establishing at least one electric arc between an electrode and a workpiece;
    (b) creating a molten puddle on said workpiece with said arc;
    (c) feeding at least two consumable wires into said molten puddle, said wires containing alloying elements so as to produce a desired alloy surface on the workpiece;
    (d) providing current through said wires in the extension portion thereof;
    (e) positioning such wires proximate to each other in the vicinity of such arcs so that the magnetic field of such arc interacts in a predetermined mode with the magnetic field created by said current flowing in said wires;
    (f) controlling the feed rate, the current and the extension of said wires so that such wires melt in the molten puddle without the establishment of an arc off the end of said wires.

15. Process according to claim 14 wherein the net magnetic field around said wires has essentially no effect on the magnetic field around the arc.

16. Process according to claim 14 wherein said electrode is consumable.

17. Process according to claim 14 wherein said electrode is consumable and contains alloying elements.

18. Process according to claim 14 wherein said electrode is consumable and the arc is shielded by a gas.

19. Process according to claim 14 wherein said electrode is consumable and the arc is shielded by a flux.

20. Process according to claim 14 wherein said electrode is consumable and the arc is shielded by a flux and a welding composition which also contains some alloying elements.

21. Process according to claim 14 wherein said electrode is nonconsumable and the arc is shielded by a gas.

22. Process according to claim 14 wherein said electrode is nonconsumable and a gas is introduced into the arc and the arc and the arc gas are passed through a constricting passage to produce a directionally stable high energy density arc and arc plasma.

23. Process according to claim 14 wherein said electrode is nonconsumable and a gas and alloy containing welding composition are introduced into the arc and the arc and arc gas are passed through a constricting passage to produce a directionally stable high energy density arc and arc plasma.

24. A method for alloying a material into the body of a base material wherein an uninterrupted alloy layer of substantially uniform depth and composition is formed on said body comprising heating a continuous lateral zone of the surface of said body with a plurality of electric arcs to form a continuous molten puddle in said zone; feeding a plurality of consumable wires into said puddle said wires containing at least one of the alloying elements necessary to create the desired alloy surface; providing current through said wires in the extension portions thereof; positioning such wires in the vicinity of such arcs; controlling the magnitude and polarity of the current flowing in such wires so that the magnetic fields created around such wires will cause the arcs in the immediate vicinity of such magnetic fields to sweep across the surface of said body; correlating the feed rate, current and extension of said wires so that such wires will melt in said puddle without the establishment of an arc; providing relative motion between said arcs and consumable wires and said surface to advance the molten zone of alloyed material to successive lateral zones on said body while allowing already molten lateral expanses to cool under conditions substantially uniform across the entire lateral zone.

25. Process according to claim 24 wherein the consumable wires are connected in circuit with an A.C. power source which provides an A.C. voltage to such wires so phased relative to the arcs to create magnetic interaction between the fields around the wires and the arcs causing the arcs to sweep across the surface of the work.

References Cited by the Examiner
UNITED STATES PATENTS

| | | | |
|---|---|---|---|
| 2,436,387 | 2/1948 | Harter et al. | 219—137 |
| 2,655,586 | 10/1953 | Schreiner et al. | 219—73 |
| 2,669,640 | 2/1954 | Outcalt et al. | 219—76 |
| 2,832,880 | 4/1958 | Duben | 219—73 |
| 2,837,627 | 6/1958 | Soulary | 219—137 |
| 3,163,743 | 12/1964 | Wroth et al. | 219—137 |

References Cited by the Applicant
UNITED STATES PATENTS

| | | |
|---|---|---|
| 3,122,629 | 2/1964 | Manz. |

RICHARD M. WOOD, *Primary Examiner.*